United States Patent
Egbert

Patent Number: 5,759,140
Date of Patent: Jun. 2, 1998

[54] METHOD AND APPARATUS FOR MACHINING HOLES IN CRANKSHAFTS

[75] Inventor: James Egbert, Sanford, Mich.

[73] Assignee: Ingersoll CM Systems, Inc., Midland, Mich.

[21] Appl. No.: 425,943

[22] Filed: Apr. 19, 1995

[51] Int. Cl.⁶ .................. B23Q 3/157; B23B 35/00; B23B 47/28

[52] U.S. Cl. .................. 483/1; 29/26 A; 408/1; 408/46; 408/50; 408/72 R; 409/164; 409/189; 409/224; 483/16; 483/30

[58] Field of Search .................. 483/1, 14, 15, 483/17, 18, 19, 30, 36, 58; 408/43, 44, 46, 50, 72 R; 29/26 A, 27 R, 888.08; 409/164, 165, 166, 168, 197, 198, 221, 224, 227; 219/69.11

[56] References Cited

U.S. PATENT DOCUMENTS

| | | | |
|---|---|---|---|
| 3,806,691 | 4/1974 | Roach | 219/69.16 |
| 4,637,107 | 1/1987 | Romen | 29/27 C |
| 4,655,652 | 4/1987 | Schissler | 29/26 A |
| 5,023,983 | 6/1991 | Winkler et al. | 29/27 R |
| 5,172,464 | 12/1992 | Kitamura et al. | 29/563 |
| 5,391,850 | 2/1995 | Mueller | 219/69.2 |

*Primary Examiner*—William R. Briggs
*Attorney, Agent, or Firm*—Fitch, Even, Tabin & Flannery

[57] ABSTRACT

A crankshaft is mounted in a fixture which rotates the crankshaft about its longitudinal axis and which tilts the crankshaft about a horizontal axis to allow machining of holes such as oil holes at various rotational positions and at various tilt angles to the longitudinal axis. Preferably, a cutting tool moves along a horizontal plunging axis Z to machine the depth of the hole and moves along a horizontal X axis to machine holes on or offset from the longitudinal axis. The cutting tool may also be shifted vertically along a Y-axis. Preferably, a pair of crankshafts are mounted side-by-side in the fixture to machine two crankshafts simultaneously. The fixture is mounted for tilting by trunnions. The pair of crankshafts are spun about the longitudinal axes by a motor carried on the tiltable fixture. An automatic tool changer and loading apparatus store cutting tools and associated guide bushings for the cutting tools.

20 Claims, 8 Drawing Sheets

METHOD AND APPARATUS FOR MACHINING HOLES IN CRANKSHAFTS

BACKGROUND OF THE INVENTION

This invention relates to a method and apparatus for machining holes in crankshafts, and more particularly, for machining holes in crankshafts on a production scale basis.

Currently, crankshafts for automobile engines, truck engines or the like are manufactured and machined in large production quantities on a multi-station transfer line, each station of which is dedicated to machining one or more holes, such as oil holes, in the crankshafts. The transfer line works relatively well in that the same crankshaft for a given production model will have identically located oil holes for thousands and thousands of crankshafts which are machined. A particular problem is that the transfer line does not lend itself to changes in engine design where it is desirable to change the engine stroke thereby changing the particular angular position and location of the oil holes in the crankshafts relative to the crankshaft axis. The transfer lines are very long, expensive and time-consuming to build and install. Large and expensive fixtures must be built and be precisely positioned at each of the transfer stations, each of which has a machine head with a hole machining tool or tools. The ability to modify engines or to change the angle and the location of the crankshaft oil holes is a limitation that is difficult to overcome when machining oil holes in a transfer line.

It will be appreciated that such transfer lines are not well adapted to handle various sizes and shapes of crankshafts as well as to more modest changes in the same crankshaft. Additionally, the oil holes may be anywhere along and across the axial length of the crankshaft and at different rotational positions about the circumference of the crankshaft. Thus, dedicated transfer lines do not provide the desired flexibility with respect to adapting to very significant changes in position and angle of the cutting tool with respect to the crank's longitudinal axis as well as to a rotational position about the circumference of the crankshaft.

On the other hand, the typical or standard cutting machine with three axes of movement is also not well suited for machining crankshafts. In such three axis machines the cutting tool is normally plunged along a given axis, vertical or horizontal. If the cutting tool for drilling of the oil holes is moved horizontally along an X or plunging axis, then it is also standard three-axis machine are able to move vertically in a Y direction normal to the horizontal plunge axis to change the height or the location of the hole along the longitudinal length of the crankshaft. The movement in the third orthogonal plane is usually or may be called a Z axis and would be a movement in the horizontal plane normal to the plunging axis. However, such machines can not readily machine oil holes anywhere along the length of the crank and at any angle through the crankshaft.

Thus, there is a need for a new and more flexible apparatus for machining oil holes in crankshafts.

SUMMARY OF THE INVENTION

In accordance with the present invention, an apparatus and method are provided in which a crankshaft is rotated about its longitudinal axis and is tilted relative to a fixed plunging axis of a cutting tool to machine oil holes at various positions and angles through the crankshaft. The cutting tool may also be moved along and across the length of the crankshaft to cut a hole anywhere along and across the axial length of the crankshaft. This is achieved by having the cutting tool travel along a fixed axis, and by mounting the crankshaft in a workholder or fixture in which the workholder and crankshaft tilt or pivot relative to the plunging axis of the cutting tool; and in which the crankshaft is spun about its longitudinal axis to the peripheral location for entry of the cutting tool. To provide oil holes anywhere along and across the axial extent of the crankshaft, the cutting tool may be moved in directions normal to the tool's plunge axis. Thus, in the preferred embodiment of the invention, the crankshaft is mounted in a fixture or workholder; and the fixture is pivoted to change the angle of the crankshaft to the plunging axis and the crankshaft is spun about its longitudinal axis to allow entry of the tool anywhere about the circumference of the crankshaft. To locate the hole position along and across the axial length of the crankshaft, the tool head is shifted vertically and horizontally relative to the crankshaft.

In accordance with the present invention, the position and angle of the oil holes may be changed by controlling the software electronic controls which control the rotational spin axis location, the degree of tilt of the crankshaft, and the location of the plunge axis relative to the length and breadth of the crankshaft.

It is preferred that the fixture or workholder have a headstock and a tailstock therein for rotatably mounting the crankshaft, and also have an open face on one side thereof to permit loading or unloading of a crankshaft through the open face.

In accordance with one aspect of the invention, a bushing for guiding the cutting tool into the crankshaft is positioned relative to the crankshaft and the cutting tool by a bushing support. The bushing support utilizes a feed mechanism to advance and to retract the bushing relative to the crankshaft and to maintain the bushing in correct relative position independent of the plunge axis during machining of holes.

In accordance with an important aspect of the invention, the machine is particularly adaptable for machining different crankshafts in that it uses different cutting tools and supporting bushings therefor from an inventory of tools and bushings carried in an automatic storage and dispensing device, such as wine rack which stores tools and bushings for each of the particular hole configurations. That is, the machine tool is able to select different tools and bushings for each of the particular hole configurations for a given crankshaft; and of course, if a different size, shape or type of crankshaft is used, the inventory of bushings and cutting tools may be changed to provide the appropriate tools for the different crankshafts.

Preferably, an automatic toolchanger is mounted at a position remote from the machining head; and the fixture is titled to enlarge a space between it and the machine head. The tool changer is then shifted into this enlarged space between the fixture and the tool head, and then the tooling is changed and the tool changer is returned to its remote position.

In accordance with another important aspect of the invention, the production capability of the apparatus is increased by mounting a plurality of crankshafts side by side in a tiltable and rotatable fixture so that multiple crankshafts are machined simultaneously by multiple tools traveling along parallel plunging axes. This provides for the increased production from a single machine.

Thus, it will be seen that the present invention is particularly directed to the use of flexible software and to machine control technology to rapidly spin and tilt the crankshafts and to shift the cutting tool to each of the various positions needed for the oil holes.

The preferred crankshaft machine is a seven axis machine with a pair of crankshafts being mounted in a fixture that pivots about a centrally located pivot axis or trunnions relative to a fixed plane containing the plunging axis, with the crankshafts being rotated or spun in the fixture about their respective axial axes. The pair of cutting tools are mounted to move in a first plunging direction which direction is normal to the directions in which the tool head shifts relative to the crankshaft's length and breadth to position the holes anywhere along and across the lengths of the crankshafts and at any angle to the axes of the crankshafts. It is much quicker and easier to be able to change the control and signal positions than to physically change dedicated transfer line equipment.

BRIEF DESCRIPTION OF THE DRAWINGS

This and other advantages of the invention will become apparent from the following detailed description taken in conjunction with the accompanying drawings in which.

DETAILED DESCRIPTION OF THE PREFERRED EMBODIMENTS

Figure 1:
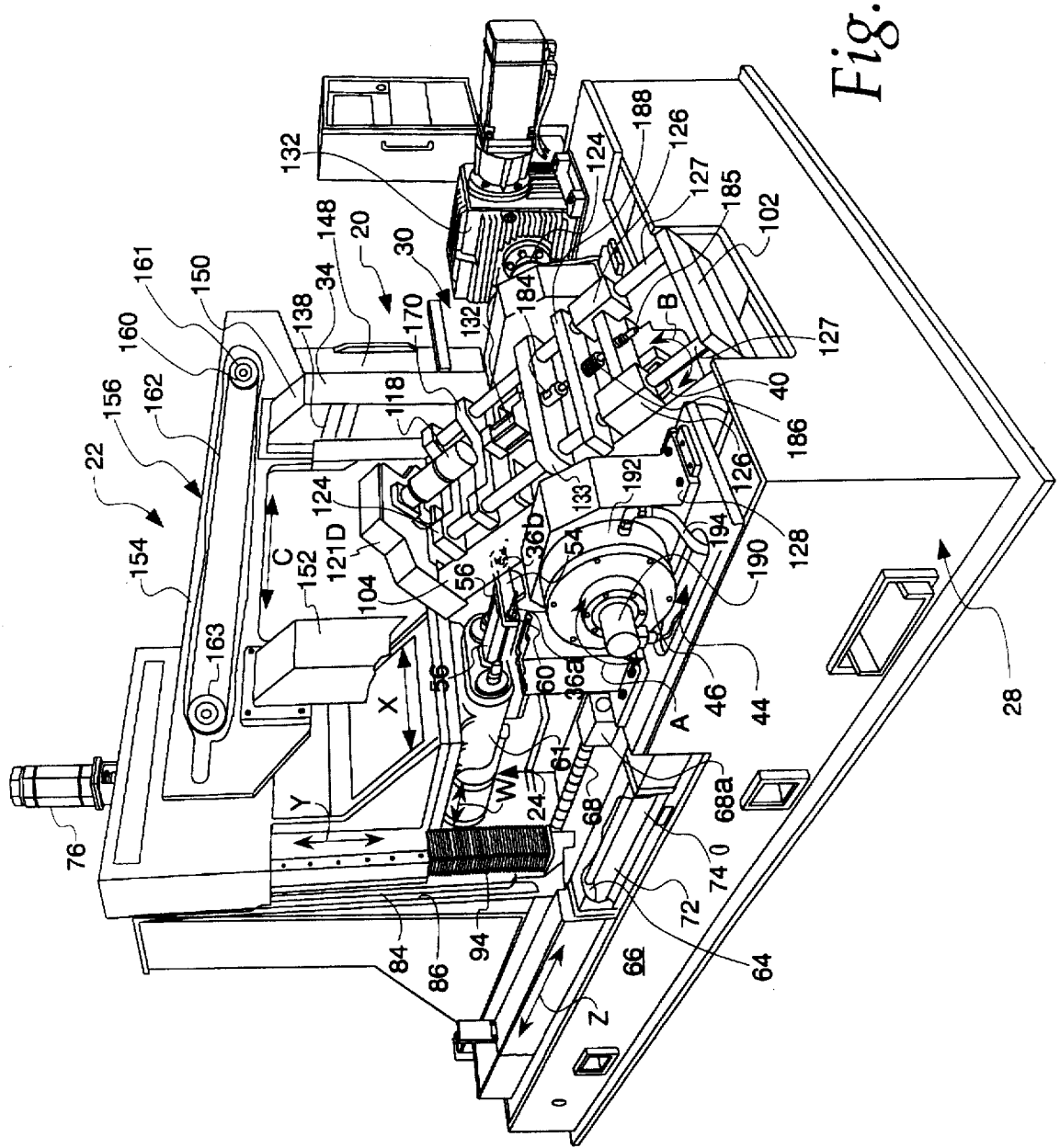
FIG. 1 is a front perspective view of an apparatus for machining holes in crankshafts at various positions and angular orientations and embodying the present invention.
Figure 2:
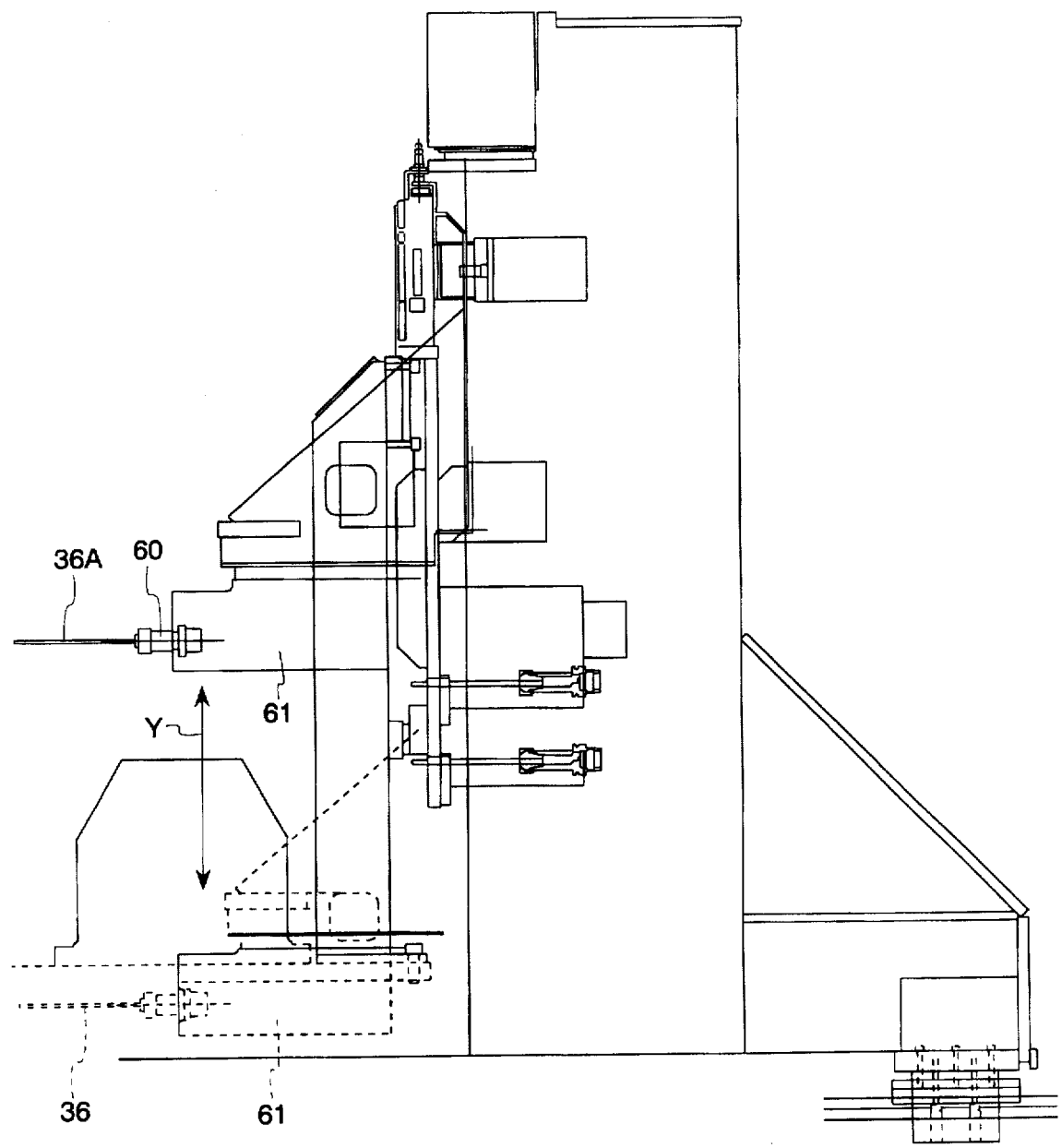
FIG. 2 is a front elevational view of the apparatus of FIG. 1 and includes the pivoting fixture that holds and rotates the crankshafts.
Figure 4:
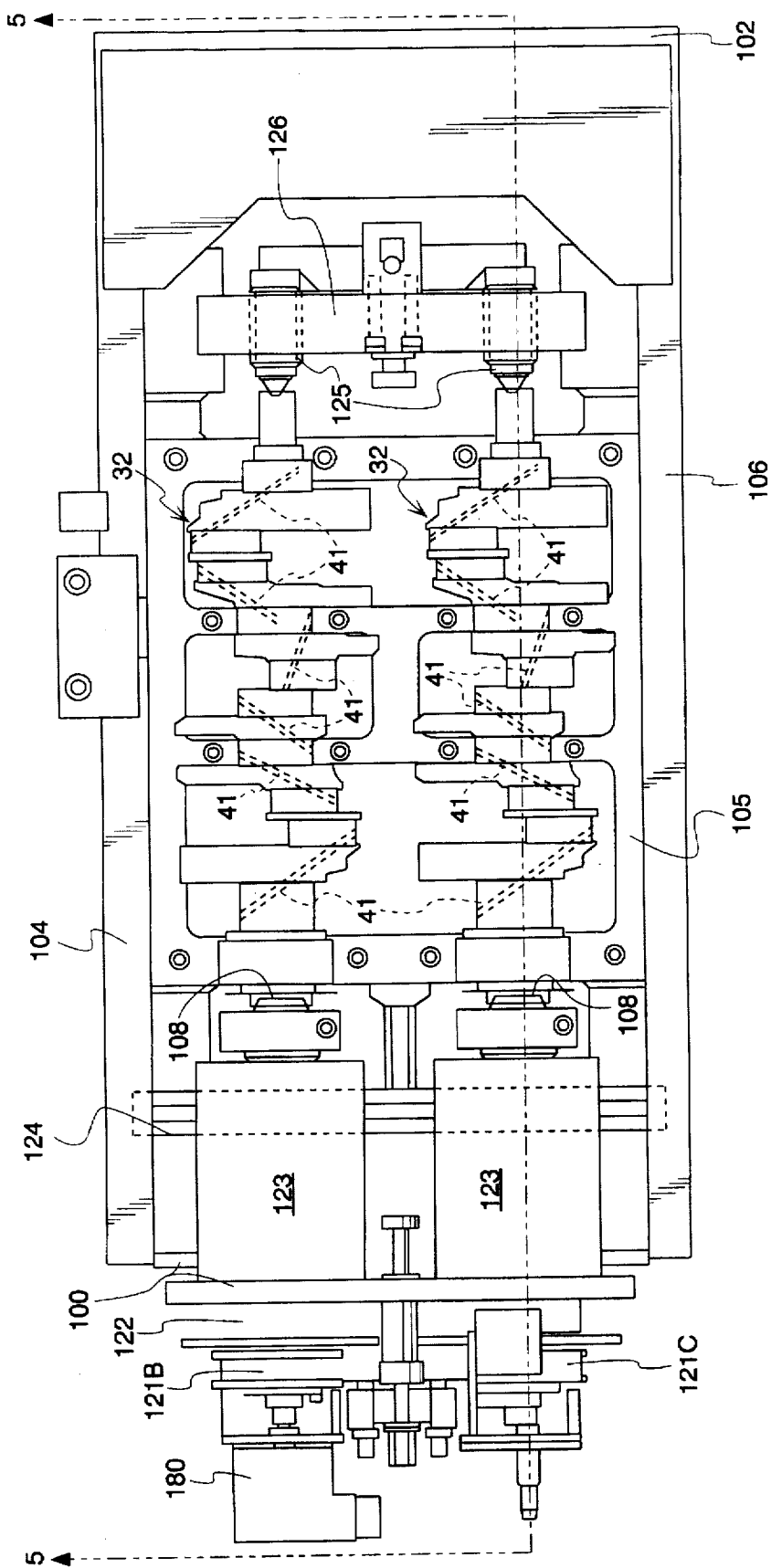
FIG. 4 is a plan view of the crankshaft fixture.

As shown in the drawings for purposes of illustration, the invention is embodied in a multi-axis machining apparatus 20 for machining holes in a crankshaft 32 (FIG. 4). As best seen in FIG. 1, the apparatus includes a three-axis machine stack 22 for translating cutting tools 36a and 36b operably held by a machine head 24 mounted to the machine stack 22. The machine stack 22 and a fixture 30 for holding and rotating a pair of crankshafts 32 are mounted on a frame or machine base 28. An automatic tool changing and loading apparatus 34 provides means for storing a plurality of cutting tools 36 including the cutting tools 36a and 36b to machine various hole configurations and means for automatically changing tools to be operably held by the machine head 24. Software driven electronic controls are used to control the three-axis capabilities of the machine stack 22, the rotating capabilities of the fixture 30, and the automatic loading apparatus 34 to position the crankshaft 32 and an appropriate cutting tool 36a relative to each other for machining of holes in the crankshaft 32 at various locations and angular orientations.

Figure 5:
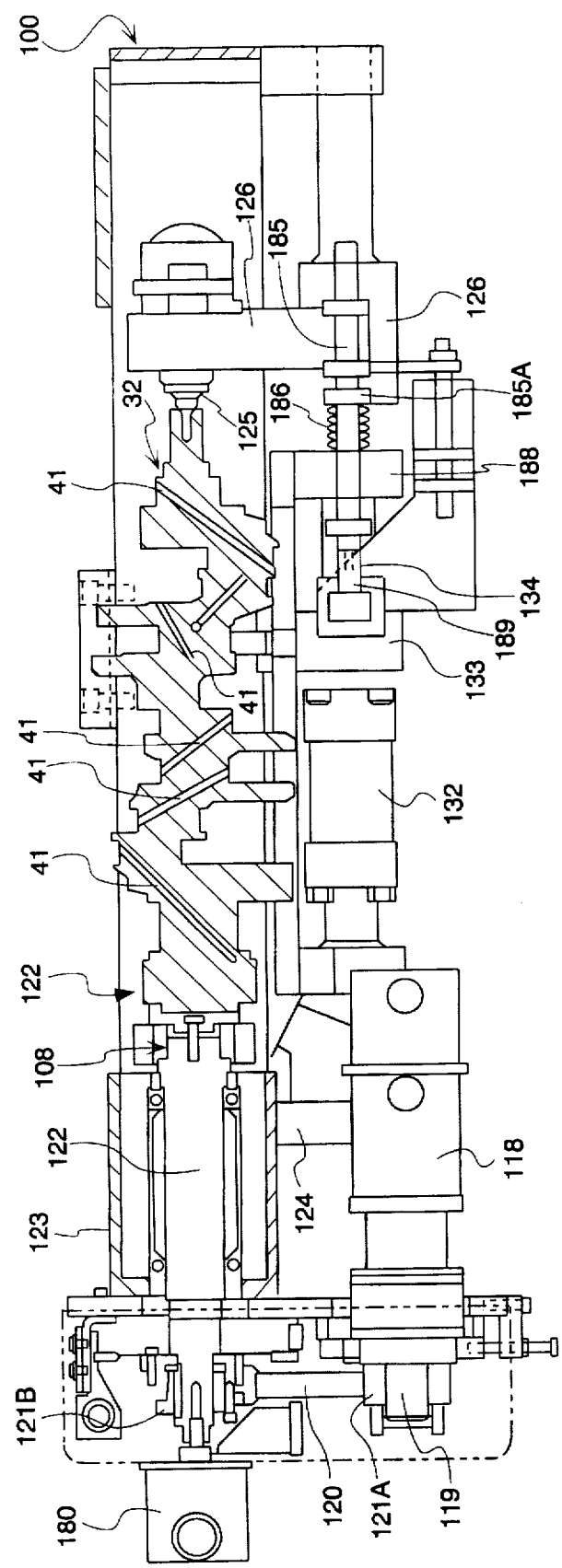
FIG. 5 is a side elevational view of the crankshaft fixture.

The crankshaft 32 has a longitudinal axis 40 (FIG. 3) about which the crankshaft will rotate when it is in an engine. Various oil holes 41 (FIGS. 4 and 5) need to be machined into the crankshaft, often at acute angles to the crankshaft, as shown in FIGS. 4 and 5, to the longitudinal axis and several oil holes need to be machined along the length of the crankshaft. The oil holes may also be at different rotational positions or locations about the crankshaft circumference such that the crankshaft needs to be turned relative to the tool in order to machine the oil holes at different circumferential locations about the crankshaft. With changes in engine stroke, the oil holes may be relocated at different circumferential locations, at different angular tilts relative to the axis, and/or at different locations along the length of the crankshaft. Improved apparatus to provide these desired changes with the requisite machining accuracy and production capabilities are needed.

In accordance with the present invention, each crankshaft 32 is readily positioned relative to the by a cutting tool 36a in the machine head 24 in a fixture 30 which has rotational means for rotating the crankshaft 32 about its longitudinal axis 40 and tilt and pivoting means 44 for tilting the crankshaft 32 about a horizontal axis 46. Directional arrow A (FIGS. 1 and 3) illustrates the tilting angular movement about the horizontal axis 46 of the fixture 30. The rotational means turns the crankshaft 32 about its longitudinal axis as indicated by the directional arrow B in FIG. 3. Thus, holes 41 may be machined at various rotational positions about the circumference of the crankshaft 32 and holes may be machined at various angles relative to the longitudinal axis 40. Each of the cutting tools 36a and 36b is movable relative to the crankshaft to machine holes along the length of the crankshaft.

Movement of the stack 22 with the cutting tools 36a and 36b thereon toward or from the crankshafts 32 for machining of holes to a depth is preferably along a horizontal plunging axis Z which is one of the three axes of the machine stack 22. The cutting tool may be shifted laterally along a second horizontal axis X of the machine stack 22, normal to the plunging axis Z, to position the cutting tool relative to the crankshaft 32 for machining holes offset from the rotational axis 40 of the crankshaft 32. The cutting tool may also be shifted along the third axis of the machine stack, which is a vertical axis Y. This axis Y is used to position the cutting tool relative to the crankshaft 32 for machining of holes anywhere along the axial extent of the crankshaft 32.

To provide the repetitive accuracy for the oil holes to be machined quickly and to the close tolerances needed, it is preferred to provide bushings 60, for guiding the cutting tools 36a and 36b into the crankshaft 32. The bushings are positioned relative to the crankshaft 32 and the cutting tools 36a and 36b by a bushing support 54 mounted to the machine stack 22 adjacent to the machine head 24. The bushing support 54 includes positioning means 56 for advancing and retracting bushings 60 up to the crankshaft 32, along a W axis that runs co-axial with plunging axis Z, but is independent of plunging axis Z. As the cutting tool plunges deeper into the crankshaft 32, the positioning means 56 retracts the bushings 60 to be closer to the drive head 61 for the cutting tools relative to the crankshaft 32, allowing the bushings 60 to guide the cutting tools into the crankshaft 32 for increased machining accuracy.

In order to provide the flexibility to change hole sizes or machining operations to each of the holes being machined, the apparatus preferably includes automatic loading apparatus 34 for storing cutting tools 36 and associated bushings 60 for each of the particular hole configurations for a given crankshaft and means for transferring the cutting tools 36 to the machine head 24 and the bushings 60 to the bushing support 54. This allows the machining apparatus 20 to select different cutting tools 36 and bushings 60 for each of the particular hole configurations for a given crankshaft. The machining apparatus 20 is particularly adaptable for machining different crankshafts as the inventory of cutting tools 36 and associated bushings 60 may be changed to provide the appropriate tools for machining crankshafts of different design.

Software-driven electronic controls are used to control the three axes Z, X, Y of the machine stack 22, the rotation about axis B and tilting about axis A of the crankshaft 32 and the fixture 30, positioning along axis W of the bushing support 54, and the automatic tool changing and loading apparatus 34 to position appropriate cutting tools 36 and bushings 60 relative to a crankshaft 32 for machining of holes in the crankshaft 32. Thus, when changing the stroke of an engine or changing from one form of crankshaft to another form of crankshaft, the software may be used to relocate the holes without physically having to relocate fixtures, add new fixtures, etc., as in transfer line machining of crankshafts.

Figure 3:
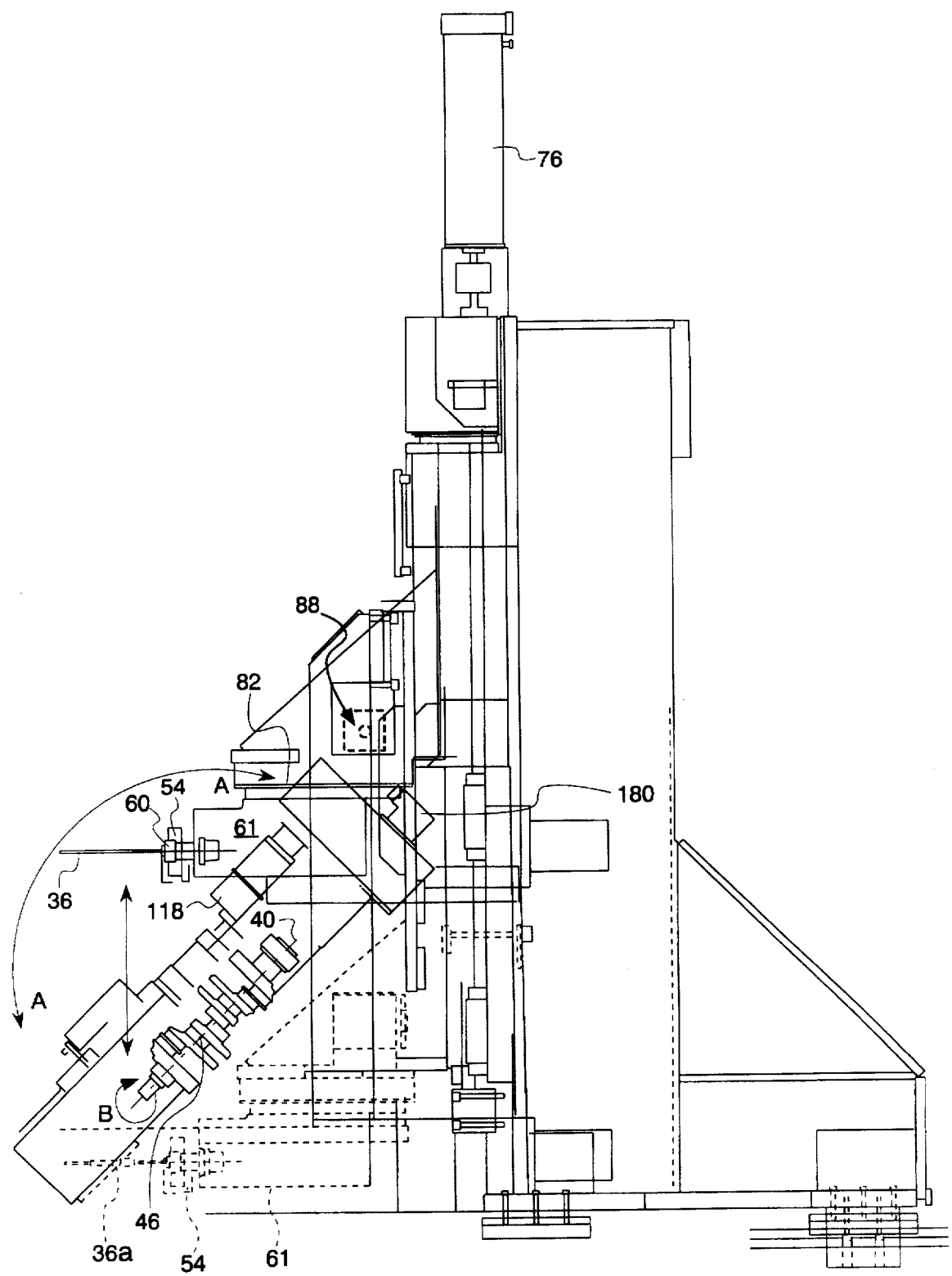
FIG. 3 is a front elevational view with the details of the crankshaft holding fixture removed so that the machine stack, machine heads, cutting tools, and bushings may be seen in greater detail.

In accordance with an important aspect of the invention, the production capability of the machining apparatus is increased by mounting a plurality of crankshafts 32 side by side in the fixture 30, as shown in FIG. 4, and by mounting a plurality of machine heads 24 with cutting tools 36a and 36b to the machine stack 22, as shown in FIGS. 1 and 3. The crankshafts 32 are spun in angular directions B about their respective, longitudinal axes 40 in the fixture 30; and the fixture 30 is tilted in angular direction A about a horizontal axis 46. This allows multiple crankshafts 32 to be machined simultaneously by multiple cutting tools traveling along parallel plunging axes Z.

Turning now in greater detail to the description of the invention, as best shown in FIG. 1 and FIG. 3 of the drawings, the three-axis machine stack 22 is driven for sliding movement in the machine base or frame 28 along the plunging axis Z by a motor (not shown) which is mounted behind the stack 22 on a stationary base 66 of the frame 28. The motor Z-axis includes feedback devices connected to circuitry that precisely positions and controls the motor. The motor is connected to a horizontal drive screw 68 (FIG. 1) threaded in a nut in the stack 22 to shift the stack. The end of the Z-axis drive screw 68 is mounted for turning in a block 68a on the stationary base 28. The stack 22 is guided for travel in the plunging axis direction Z by its linear roller bearings 64 which are slidable along guide rails 74 on the frame 28. The machine head 24 is driven vertically with respect to the first carriage along the vertical axis Y by a motor 76 and its feedback means, which are secured to the stack 22 and rotate through a coupling to a vertically-extending screw 78 threaded in a nut mounted on a machine head carriage 82. The machine head carriage is guided for travel relative to the first carriage in the vertical axis direction Y by its linear bearings 84 which slide along vertical fixed guide rails 86 on the first carriage 70.

Lateral movement of the machine head 24 along the lateral or second horizontal axis X is provided by a motor 88 (FIG. 3) and its feedback device (and circuit means) which are mounted to the second carriage 82. The motor 88 is connected to a horizontal screw 89 turning in a nut 92 mounted on a third carriage 94 which is guided for travel in the second horizontal direction X by its horizontal linear bearings 96. These third carriage slide bearings engage and slide horizontally on guide rails 98 on the second carriage 82.

The machine head 24 is carried by the third carriage 94 for shifting horizontally in relation to the rotational axis 40 of the crankshafts 32 by movement of the third carriage 94 along the second horizontal axis X. Because the machine head and third carriage are mounted on the second carriage 82, movement of the second carriage vertically shifts the tool 36a along the axial extent of the crankshafts 32 by movement of the second carriage 82 along the vertical axis Y. Because the tool head and second carriage 82 are mounted on and carried by the first carriage, the tool 36 may be moved toward or from the crankshaft by movement of the first carriage 70 along the plunging axis Z. Thus, movement of the cutting tool 36a, operably held by the machine head 24, along the plunging Z, second horizontal X, and vertical Y axes is provided by the machine stack 22 mounted to the frame 28.

In order for the pair of plunging tools 36a to have access to the crankshafts 32 anywhere intermediate the ends of the respective crankshafts while they are mounted in fixture 30, the fixture preferably is in shape of a box-shaped, open frame 90 (FIG. 6) with a large center, rectangular opening face 91 to expose the crankshafts throughout substantially their entirety. This open box-shaped frame 90 is mounted for tilting about the pivot start axis 46 by the pivot or tilting means 44 located at the horizontal pivot axis 46 which, in this instance, is centrally located between upper and lower ends of the fixture frame 90.

As best seen in FIGS. 1, 2, 4 and 6, the fixture frame 90 is defined by an upper beam member 100, a lower beam member 102, a left side beam member 104, and a right side beam member 106. The four beam members define a rectangular, box-like frame 90 to support the crankshafts, headstocks, tailstocks and motor to rotate the crankshafts. The four beam members constitute a part of the fixture that is trunnion mounted to tilt about axis A. Thus, the support frame 90 of the fixture 30 has a generally rectangular shape with a open central area for mounting the crankshafts 32 and for providing maximum cutting tool access to the crankshafts 32.

Tilting of the fixture 30 relative to the plunging axis of the cutting tools 36a and 36b is provided by the pivots means 44 which include the stub shaft trunnions 124 (FIG. 8) fixed to the centers of the left and right 106 beam members 104 and 106 of the fixture 30. The stub shaft trunnions extend horizontally outward from the left and right beams 104 and 106 and are journaled in large bearings in stationary bearing mounts 128 each fastened at their lower ends to the top of the stationary base 66. The stub shafts trunnions are fixed to the beams at their inner ends 124a so that the turning of the trunnions also turns the beams and thereby the carrier about the tilt axis through the centers of the trunnions. The trunnions are supported for turning in large bearings 129 (FIG. 8) in bearing mounts 128 secured at their lower bases to the frame base 66. These large and heavy trunnions and bearings mount the fixture frame for precise tilting. As best seen in FIG. 1, the right trunnion 124 is driven by a driven by a motor 132 that is precisely positioned and controlled. Suitable feedback devices which include an encoder 190 are connected to the end of the left-hand stub shaft trunnion 124 to provide exact information as to the tilt location of the fixture and crankshafts. The motor 132 is mounted on the frame base 66.

To precisely hold the trunnions 124 and fixture 30 against rotation during machining, hydraulic brakes 192 have a first rotatable portion 192a secured to the trunnion shafts and a second stationary portion 192b secured to the bearing mount 128. The hydraulic brake 192 is actuated by fluid in a hydraulic brake line 194 to lock the trunnion shafts and thereby the fixture against movement during the drilling of holes 41 in the crankshafts.

Figure 6:
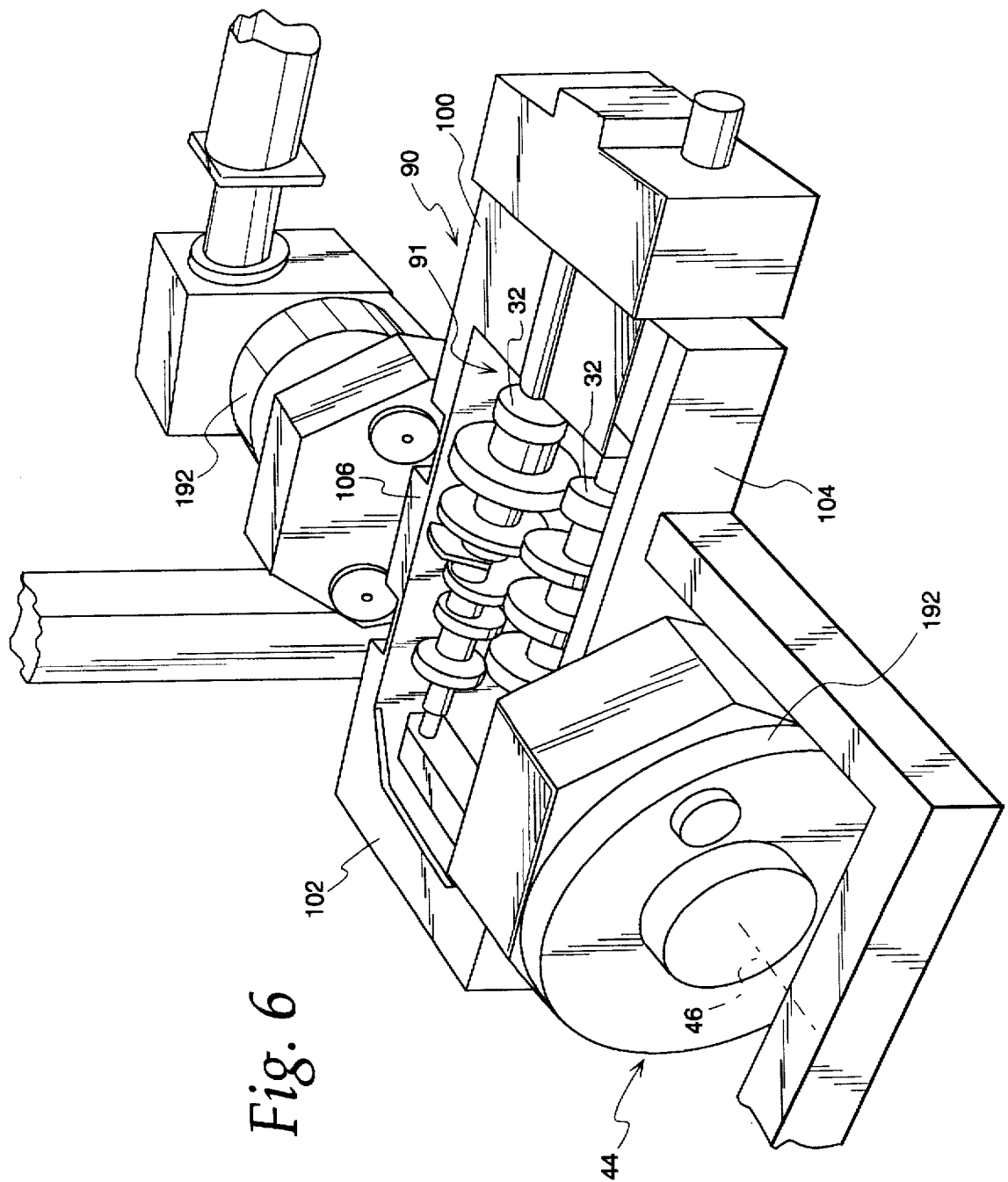
FIG. 6 is a simplified, perspective view of the crankshaft holder in its crankshaft removal or receiving position.

The fixture 30 may be rotated to a crankshaft receiving position such as shown in FIGS. 4 and 6, where the fixture is generally horizontal and presents an open face that allows crankshafts to be loaded through the open face thereof. When the fixture 30 is tilted to present the crankshafts to the tools, as shown in FIG. 1 for machining, the underside of the fixture has been rotated to an upper position with a motor 118, slide rods 127 and crankshaft cradle blocks 170 and 172 being uppermost, thereby preventing a lifting of the crankshafts by an overhead gantry, not shown. As will be explained, the motor, slide rods and cradle blocks are all on the underside of the fixture so that an open face 91 on the upper side of the fixture is available for removal of machined crankshafts from the cradle blocks, and the insertion of new crankshafts into the cradle blocks in the fixture.

Figure 8:
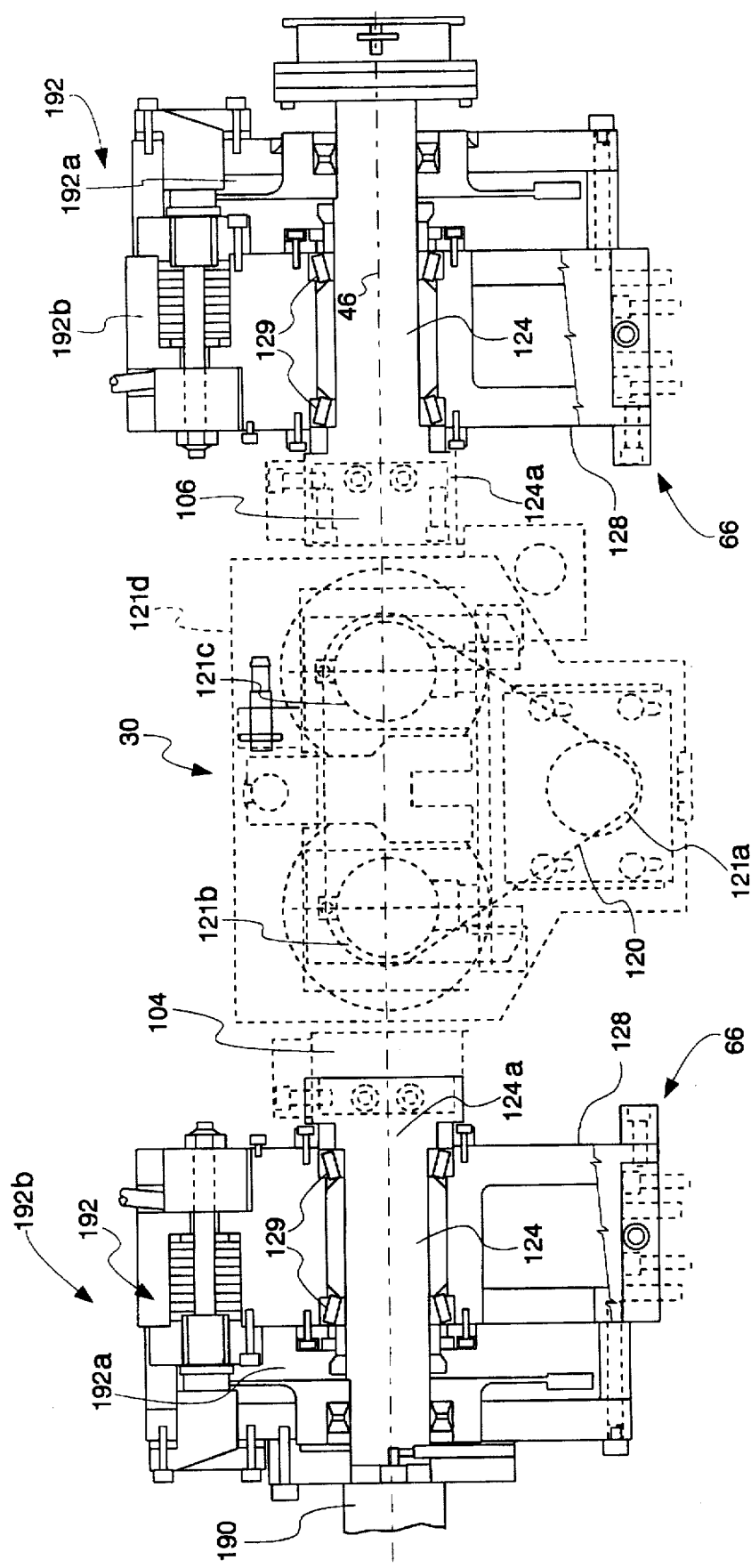
FIG. 8 is a cross-sectional view through trunnion shafts and bearings mounting the fixture for tilting movement.

The crankshafts are rotated simultaneously about their respective longitudinal axes 40 by a motor 118 (FIGS. 1 and 5) which is mounted on the underside of the fixture 30. The motor 118 has a drive shaft 119 which turns a sprocket 121a meshed with a drive timing belt 120. The timing belt is also entrained about sprockets 121b and 121c, which are mounted on the ends of headstock shafts 122 rotatable in headstocks 123. The sprockets and timing belt are covered by a triangular-shaped cover 121d (FIGS. 1 and 8). Encoders 180 (FIG. 5) are connected on the ends of the headstock shafts 122 to read the exact rotational position of the crankshaft. The headstocks are secured to a stationary end plate and top beam member 100 of the fixture 30, and weight of the headstocks is also supported by a cross bar 124 spanning the side beam members 104 and 106 of the fixture 40. The headstocks have ends 108 for centering and engaging upper ends of the crankshafts and for imparting a rotating torque to the crankshafts. At their opposite ends, the crankshafts are each rotatably mounted in a tailstock 125. The tailstocks 125 are each mounted in a slide bar or carrier 126. As best seen in FIG. 1, the slide bar 126 is mounted for sliding in the longitudinal direction along a pair of parallel slide rods 127 that are fixed to extend longitudinally along the underside of the fixture 30. The parallel slide rods 127 have lower ends (FIG. 1) mounted on a transverse plate 129 which is fixed to lower end beam 102 of the fixture frame. Upper ends of the slide rods 127 are fixedly secured to the upper transverse bar 124 which spans across and is secured to the side beams 104 and 106 of the fixture frame.

To shift the tailstocks 125 and their slide carrier 126 along the slide rods 127, a motor such as a hydraulic cylinder 132 is provided and is mounted on a transverse, stationary fixture plate 133 (FIGS. 1 and 5) which is bolted to the fixture side beams 104 and 106. The hydraulic cylinder 132 has a piston rod 134 connected by a coupling 184 to an axially aligned rod 185. When the hydraulic cylinder is actuated, it retracts its piston rod 134 and attached rod 185, and pulls the slide carrier 126 along the parallel slide bars 127 toward the motor and headstock. The lower end of the rod 185 projects through a bore in the tailstock support bar 126. When the piston rod 134 and attached rod 185 are pulled toward the motor, springs 186 are compressed between a collar 185a on the rod 185 and cradle plate 188. When the actuating cylinder force is released, the springs 186 shift the cradle plate 188 and the cradle blocks 170 and 172 are connected thereto toward the tailstock. Thus, the crankshafts are supported on the cradle blocks 170 and 172 that slide on the parallel slide rods 127. The cradle blocks support the crankshafts during removal of a machined crankshaft and after the placement of a new crankshaft for machining on the cradle blocks and prior to engagement of the headstock and tailstocks with the ends of the crankshaft.

Figure 7:
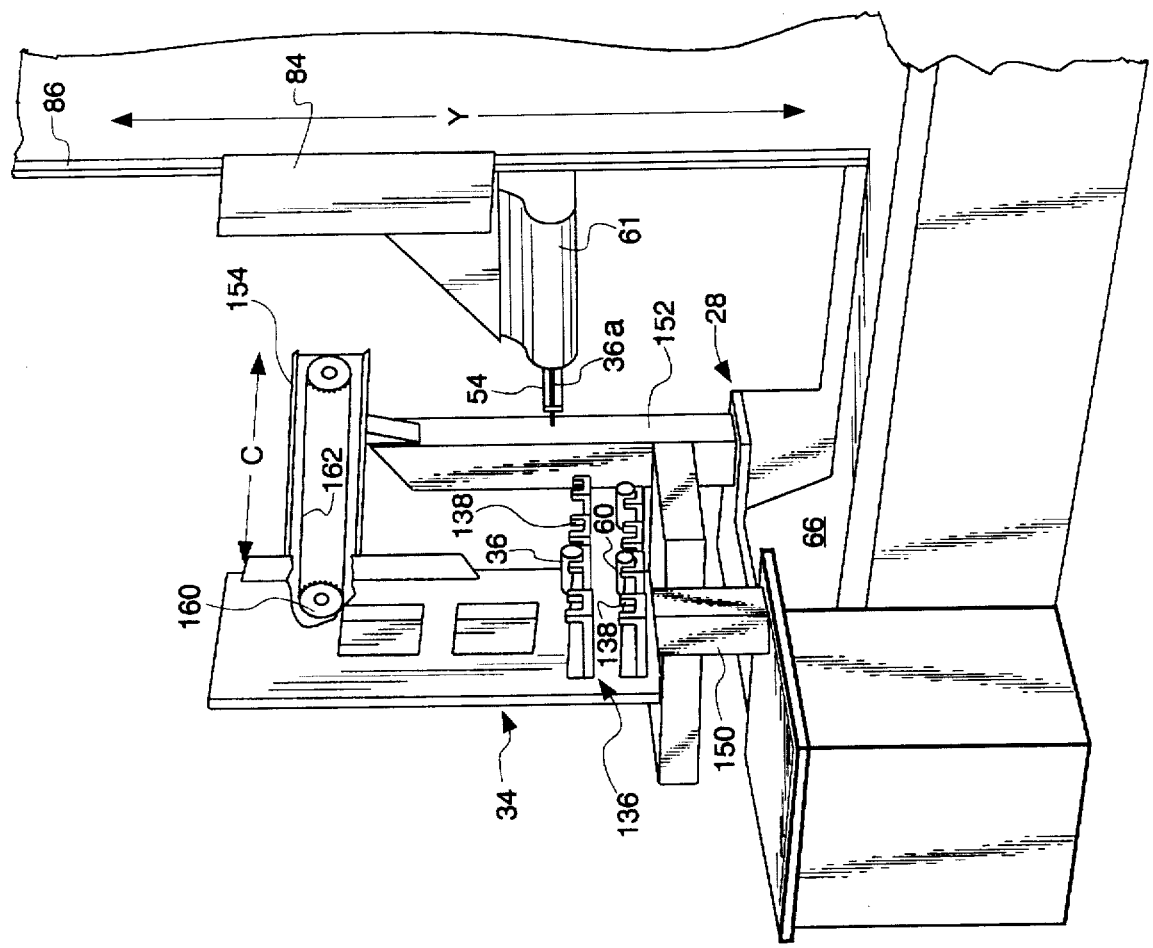
FIG. 7 is a simplified, perspective view of the automated tool holder for tools and bushings.

As best seen in FIGS. 1, 3 and 7, the automatic loading apparatus 34 stores cutting tools 36 and associated bushings 60 in a matrix rack 136, commonly known as a wine rack, mounted to the frame 28 with a front face of the wine rack 136 facing away from the machine stack 22 and a back face of the wine rack 136 facing towards the machine stack 22. The wine rack 136 includes a matrix of storage positions 138, each containing a pair of cutting tools 36 and their associated support bushings 60. The wine rack 136 has a sufficient number of storage positions to store all the cutting tools 36 and associated bushings 60 required to machine each of the particular hole configurations for a given crankshaft 32. Each cutting tool 36 is mounted in a tool holder having a front end for holding the cutting tool and a back end with a tapered shank for operable engagement with the machine head 24. Each bushing 60 has a front end for guiding the cutting tool 36 into the crankshaft 32 and a back end with a tapered shank for engagement with the bushing support 54. Each cutting tool 36 and associated bushing 60 are mounted together in a storage position with the cutting tool 36 fully engaged with its associated bushing 60. The fronts of the tool holder 140 and the bushing 60 face the front of the wine rack 136, with the tapered shanks of both the tool holder 140 and bushing 60 extending from the back of the wine rack 136 for respective engagement with the machine head 24 and the bushing support 54.

The automatic loading apparatus 34 transfers cutting tools 36 and associated bushings 60 from a storage position in the wine rack 146 to the machine head 24 and to the bushing support 54. To this end, the vertical wine rack 146 is mounted at a location behind an outer vertical pillar 150 when the wine rack is in its non-tool changing position. The wine rack is slidably mounted on the base 66 of the frame 28 to travel from the remote non-tool changing position of FIG. 1 to a tool and bushing changing position (not shown) between the tool head and the crankshaft fixture. In order to provide the space to receive the wine rack, the crankshaft fixture is first rotated to a vertical position. A second frame vertical pillar 152 supports an upper, horizontal bridge 154 which is supported at its opposite end by the first pillar 150. Mounted within the hollow bridge 154 is a drive means 156 for sliding the tool carrier in the X and U axis direction. Herein, the drive means includes a motor 160 mounted on the bridge with its motor shaft driving an endless chain 162 that extends between the drive sprocket 161 driven by the drive motor 160 and a sprocket 163 mounted on the stack 22. A drive bracket fixed to the chain extends laterally and is secured to the wine rack so that as the chain 162 travels along a "U" axis for shifting, the wine rack is pulled along the U-axis. The U-axis is parallel to the "X" axis movement of the tool head. The wine rack is guided for sliding along the "U" axis by upper slides on the wine rack and bridge and lower bronze guide slides sliding on the stationary base frame 24.

The automatic loading apparatus 34 transfers cutting tools 36a and 36b and bushings 60 from a storage position in the wine rack to the machine head 24 and to the bushing support 54. When the wine rack is in its tool and bushing transfer position, the machine stack 22 then translates the machine head 24 and bushing support 54 forward into engagement with the respective tapered shanks of the tool holder 140 and the bushing 60. The machine head 24 and bushing support 54 are then translated upward to lift the cutting tool 36 and associated bushing 60 from the wine rack 136. Transfer of a cutting tool 36 and associated bushing 60 from the machine head 24 and bushing support 54 back to the wine rack 138 is performed in a similar fashion, with the machine stack 22 translating the machine head 24 and bushing support 54 into position so that they can place the cutting tool 36 and bushing 60 into the appropriate storage position 138.

The present invention is particularly directed to the use of flexible software and machine control technology to rapidly select appropriate tools, spin and tilt the crankshafts 32, and shift the tools to each of the various positions needed for machining holes in a crankshaft 32. It is much quicker and easier to change the software driven electronic controls of the machining apparatus 20 than to physically change dedicated transfer line equipment.

What is claimed is:

1. An apparatus for machining holes in crankshafts at various angular positions about a longitudinal axis through the crankshaft and at various tilt angles to the rotational axis, comprising:
   a frame;
   a rotational means on the frame for supporting a crankshaft and for rotating the crankshaft about the crankshaft's longitudinal axis to present different angular positions for the machining of holes;
   a machine head mounted on the frame with a tool, movable along a plunging axis to present the tool to the crankshaft to machine holes therein; and
   tilt means on the frame mounting the crankshaft to tilt the crankshaft at various angles to the plunging axis so that holes may be machined at various rotational positions about the crankshaft and at various tilt angles to its longitudinal axis.

2. An apparatus in accordance with claim 1 wherein rotational means comprises a crankshaft supporting fixture, means in the fixture mounting the crankshaft for turning about the rotational axis of the crankshaft within the fixture; and wherein the tilt means includes pivot means on the frame for pivotally mounting the fixture to pivot relative to the plunging axis.

3. The apparatus of claim 2 wherein a slide means of the machine frame guides the machine head for travel along the plunging axis, another slide means of the machine frame guides the machine head for travel along a first positioning axis normal to the plunging axis, and another slide means of the machine frame guides the machine head for travel along a second positioning axis that is normal to both the first positioning axis and the plunging axis.

4. The apparatus of claim 1 further comprising means for storing a plurality of tools and tool support bushings, adjacent the machine head for automatic transfer of different tools to the machine head.

5. The apparatus of claim 1 further comprising means for positioning a tool support bushing in correct position between the crankshaft and the tool.

6. The apparatus of claim 1 wherein a second rotational means is provided on the fixture for supporting a second crankshaft for synchronous rotational positioning of the second crankshaft with the first crankshaft; and
   a second machine head is provided having a tool, synchronously movable with the first machine head along the plunging axis to present tools to the pair of crankshafts after the crankshafts have been rotatably positioned and tilted relative to the plunging axis.

7. The apparatus of claim 1, wherein pivot means on the frame are provided and the tilt means comprise a fixture mounted on the pivot means for tilting about an axis through the pivot means.

8. An apparatus for machining holes in crankshafts at various angular positions about a longitudinal axis through the crankshaft and at various tilt angles to the rotational axis, comprising:
   a frame;
   a fixture on the frame having means for supporting a crankshaft for rotational positioning of the crankshaft about the crankshaft's longitudinal axis;
   means on the fixture for turning the crankshaft in a first, angular direction about the crankshaft's longitudinal axis while the crankshaft is supported in the fixture to present different peripheral surface sections of the crankshaft;
   a first machine head for carrying a tool, movable along three axes;
   the first axis being a vertical axis for positioning the tool vertically relative to the crankshaft;
   the second axis being a horizontal axis for positioning the tool horizontally relative to the crankshaft;
   the third axis being a horizontal plunging axis which is normal to the first and second axes, for presenting the tool to the crankshaft; and
   tilt means on the frame for tilting the fixture and the crankshaft carried thereon through a second angular rotation about a tilt axis and relative to the plunging axis to machine holes at various angles to the longitudinal axis and at various peripheral locations about the crankshaft.

9. The apparatus of claim 8 further comprising:
   a second machine head having a tool, synchronously movable with the first machine head along three axes; and
   wherein, the fixture has means for supporting a pair of crankshafts for the synchronous rotational positioning of the crankshafts about the crankshafts' longitudinal axes.

10. An apparatus for machining holes in crankshafts at various angular positions about a longitudinal axis through the crankshaft and at various tilt angles to the rotational axis, comprising:
    a frame;
    a fixture having means for supporting a plurality of crankshafts for the synchronous rotational positioning of the crankshafts about the crankshafts' longitudinal axes;
    tilt means on the frame including trunnions mounting the fixture for tilting in an angular direction about a horizontal axis through a central portion of the fixture to present the crankshafts at various tilt angles to the plunging axis;
    means on the fixture for turning each of the crankshafts about their respective, longitudinal axes in a second angular direction while the crankshafts are supported in the fixture;
    a plurality of machine heads having tools, synchronously movable along three axes: the first axis being a vertical axis for positioning the tools vertically relative to the crankshafts; the second axis being a horizontal axis, parallel to the axis of the trunnions, for positioning the tools horizontally relative to the crankshafts; the third axis being a plunging axis, normal to the first and second axes, for presenting the tools to the crankshafts after the crankshafts have been rotatably positioned about both the axis of the trunnions and the crankshafts' longitudinal axes;
    means for storing a plurality of tools and tool support bushings, adjacent the machine heads for automatic transfer of different tools and tool support bushings to the machine heads; and
    means for positioning the tool support bushings in correct position between the plurality of crankshafts and tools.

11. An apparatus for machining holes in crankshafts at various angular positions about a longitudinal axis through the crankshaft and at various tilt angles to the rotational axis, comprising:

a frame;

a crankshaft workholder mounted on the frame for supporting a crankshaft for rotation about the crankshaft's longitudinal axis to present different angular positions for the machining of holes;

a machine head mounted on the frame with a tool, movable along a plunging axis to present the tool to the crankshaft to machine holes therein;

tilt means on the frame mounting the crankshaft workholder to tilt the crankshaft workholder at various angles to the plunging axis so that holes may be machined at various rotational positions about the crankshaft and at various tilt angles to its longitudinal axis; and an open face on one side of the crankshaft workholder to allow loading and unloading of a crankshaft when the workholder is tilted to a crankshaft loading position.

12. An apparatus in accordance with claim 11 wherein a headstock and a tailstock for rotating the crankshaft are mounted on the crankshaft workholder; and means for moving the headstock relative to the tailstock to load or unload a crankshaft are on one side of the crankshaft workholder, leaving an opposite side open for lifting from an dropping into of crankshafts.

13. An apparatus in accordance with claim 11 wherein an automatic tool changer is movable from a remote position to a tool changing position between the crankshaft workholder and the machine head.

14. An apparatus in accordance with claim 13 wherein means on the frame guide the automatic tool changer to slide laterally into a space created when the workholder is tilted to create more space between it and the machine head.

15. A method of machining crankshafts comprising the steps of:

loading a crankshaft into a pivotable fixture;

tilting the fixture about a first tilt axis relative to a tool-plunging axis;

rotating the crankshaft in the fixture about the longitudinal axis of the crankshaft to align the hole location with the plunging axis;

machining a first hole in the crankshaft;

moving a tool head carrying a tool in three orthogonal directions relative to the crankshaft in the fixture to position the tool for machining another hole along the length of the crankshaft;

machining a second hole in the crankshaft; and unloading the crankshaft with machined holes therein.

16. A method of machining crankshafts in accordance with claim 15 including the step of loading a pair of crankshafts in the fixture and machining each of the crankshafts simultaneously.

17. A method of machining crankshafts in accordance with claim 15 including the step of providing a machine tool having at least three axes with the plunging axis being a horizontal axis, and in which the step of moving the tool relative to the crankshaft includes the step of shifting the tool head vertically along a vertical axis.

18. A method of machining crankshafts comprising the steps of:

positioning a crankshaft fixture to have an open face facing upwardly to receive at least one crankshaft therein;

loading at least one crankshaft into the fixture through the open face thereon;

tilting the fixture to present the crankshaft to a tool and at a predetermined angle to the longitudinal axis of the crankshaft;

rotating the crankshaft in the fixture to present a predetermined location on the crankshaft to be machined;

plunging the tool into the workpiece to machine a hole at the predetermined location and at the predetermined angle, to the longitudinal axis of the crankshaft;

removing the tool from the hole formed in the workpiece; and tilting the fixture to position the crankshaft for removal from the fixture.

19. A method in accordance with claim 18 including the further step of providing an automatic toolchanger at a position remote from the machine head;

shifting the automatic toolchanger laterally into a space between the machine head and the fixture; and automatically changing tools on the machine head.

20. A method in accordance with claim 19 including the step of rotating the fixture to shift a portion thereof from its crankshaft presenting position for machining to enlarge the space to accommodate the automatic tool changers lateral movement to the tool changing position between the fixture and the machine head.

* * * * *